(12) United States Patent
Hollingsworth

(10) Patent No.: US 12,311,695 B2
(45) Date of Patent: May 27, 2025

(54) TAXIDERMY DISPLAY APPARATUS AND METHOD OF USE

(71) Applicant: Hollingoutbone LLC, Preston, ID (US)

(72) Inventor: KC Hollingsworth, Preston, ID (US)

( * ) Notice: Subject to any disclaimer, the term of this patent is extended or adjusted under 35 U.S.C. 154(b) by 784 days.

(21) Appl. No.: 17/561,583

(22) Filed: Dec. 23, 2021

(65) Prior Publication Data

US 2023/0202226 A1 Jun. 29, 2023

(51) Int. Cl.
*B44C 5/02* (2006.01)

(52) U.S. Cl.
CPC ...................... *B44C 5/02* (2013.01)

(58) Field of Classification Search
CPC .................. B44C 5/02; G09B 23/36
See application file for complete search history.

(56) References Cited

U.S. PATENT DOCUMENTS

| | | | | |
|---|---|---|---|---|
| 2,003,896 | A | * | 6/1935 | Menger ............... B44C 5/02 434/296 |
| 4,449,873 | A | * | 5/1984 | Barth .................. F16B 13/0808 411/341 |
| 4,464,440 | A | | 8/1984 | Dotzman .................. 428/542.4 |
| 4,717,626 | A | | 1/1988 | Badger ..................... 428/542.4 |
| 4,971,865 | A | | 11/1990 | Nowlan ..................... 428/542.4 |
| 5,248,121 | A | | 9/1993 | Harrington ................... 248/477 |
| 5,440,867 | A | | 8/1995 | Strus .............................. 56/332 |
| 5,472,765 | A | | 12/1995 | Green ............................ 428/99 |
| 5,779,294 | A | | 7/1998 | Magri ............................ 294/61 |
| 6,828,035 | B1 | | 12/2004 | Goettl ....................... 428/542.4 |
| 7,243,888 | B2 | | 7/2007 | Peek ............................ 248/304 |
| 8,459,601 | B2 | | 7/2013 | Shaw ......................... 248/220.41 |
| 9,248,696 | B2 | | 2/2016 | Maria ......................... B44C 5/02 |
| D792,278 | S | * | 7/2017 | Jacobson .................... D11/164 |
| 9,972,221 | B2 | | 5/2018 | Raby ........................ G09B 23/36 |
| 10,400,950 | B1 | | 9/2019 | Hauser .................... F16M 13/022 |
| 2006/0154224 | A1 | | 7/2006 | St.Ama ........................ 434/296 |
| 2007/0023601 | A1 | * | 2/2007 | Peek ........................ G09B 23/36 248/304 |
| 2011/0031363 | A1 | | 2/2011 | Shaw ......................... 248/220.22 |
| 2011/0035921 | A1 | * | 2/2011 | Spooner .................... A45F 5/02 224/271 |
| 2012/0219731 | A1 | | 8/2012 | Paragamian ................... 428/16 |
| 2013/0014373 | A1 | * | 1/2013 | Jordan ..................... B29C 33/3842 264/222 |
| 2014/0209768 | A1 | | 7/2014 | Maria ....................... 248/222.14 |
| 2018/0261129 | A1 | | 9/2018 | Raby ........................ G09B 23/36 |

* cited by examiner

*Primary Examiner* — Jay Trent Liddle
*Assistant Examiner* — Alyssa N Brandley
(74) *Attorney, Agent, or Firm* — Michael R. Schramm

(57) ABSTRACT

The present invention is a taxidermy display apparatus (TDA) and method of use. The TDA provides for a simple and low cost means for displaying a taxidermy mount such as the skull of a deer or other animal, preferably by providing for the ready suspension of such taxidermy mount. The TDA comprises an eyebolt, a washer, a barrel nut, and an anchor. In practice, a user positions the anchor within the skull, places the washer on top of the skull, threads the eyebolt through the washer—the eyebolt passing through a natural or created hole in the skull—and threads the eyebolt through the anchor. With a taxidermy mount thus affixed to the TDA, TDA with a taxidermy mount affixed thereon is suspended from a holding structure via the eyelet of the eyebolt.

20 Claims, 6 Drawing Sheets

TAXIDERMY DISPLAY APPARATUS AND METHOD OF USE

FIELD OF THE INVENTION

The present invention relates to taxidermy display apparatuses, and in particular, to taxidermy display apparatuses that provided for a simple and convenient means to display, preferably by suspension, a taxidermy mount (e.g. an animal skull).

BACKGROUND OF THE INVENTION

Various means and apparatuses are known in the art displaying a taxidermy mount. However, such taxidermy display apparatuses are not heretofore known to provide the utility of the instant invention. Examples of taxidermy display apparatuses are disclosed in the following list of US patents and applications, all of which are expressly incorporated herein by reference: U.S. Pat. No. 4,464,440 to Dotzman, U.S. Pat. No. 4,717,626 to Badger, U.S. Pat. No. 4,971,865 to Nowlan, U.S. Pat. No. 5,248,121 to Harrington, U.S. Pat. No. 5,472,765 to Green, U.S. Pat. No. 5,779,294 to Magri, U.S. Pat. No. 6,828,035 to Goettl, U.S. Pat. No. 7,243,888 to Peek, U.S. Pat. No. 8,459,601 to Shaw, U.S. Pat. No. 9,248,696 to Maria, U.S. Pat. No. 9,972,221 to Raby, U.S. Pat. No. 10,400,950 to Hauser, 20060154224 to St. Ama, 20110031363 to Shaw, 20120219731 to Paragamian, 20140209768 to Maria, and 20180261129 to Raby.

SUMMARY OF THE INVENTION

The present invention is a taxidermy display apparatus (TDA) and method of use. The TDA provides for a simple and low cost means for displaying a taxidermy mount such as the skull of a deer or other animal, preferably by providing for the ready suspension of such taxidermy mount. The TDA comprises an eyebolt, a washer, a nut, and an anchor. In practice, a user positions the anchor within the skull, places the washer on top of the skull (such as over the sagittal crest of the skull), threads the eyebolt through the washer—the eyebolt passing through a natural or created hole in the skull (such as over the sagittal crest of the skull)—and threads the eyebolt through the anchor. With a taxidermy mount thus affixed to the TDA, TDA with a taxidermy mount affixed thereon is suspended from a holding structure via the eyelet of the eyebolt.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
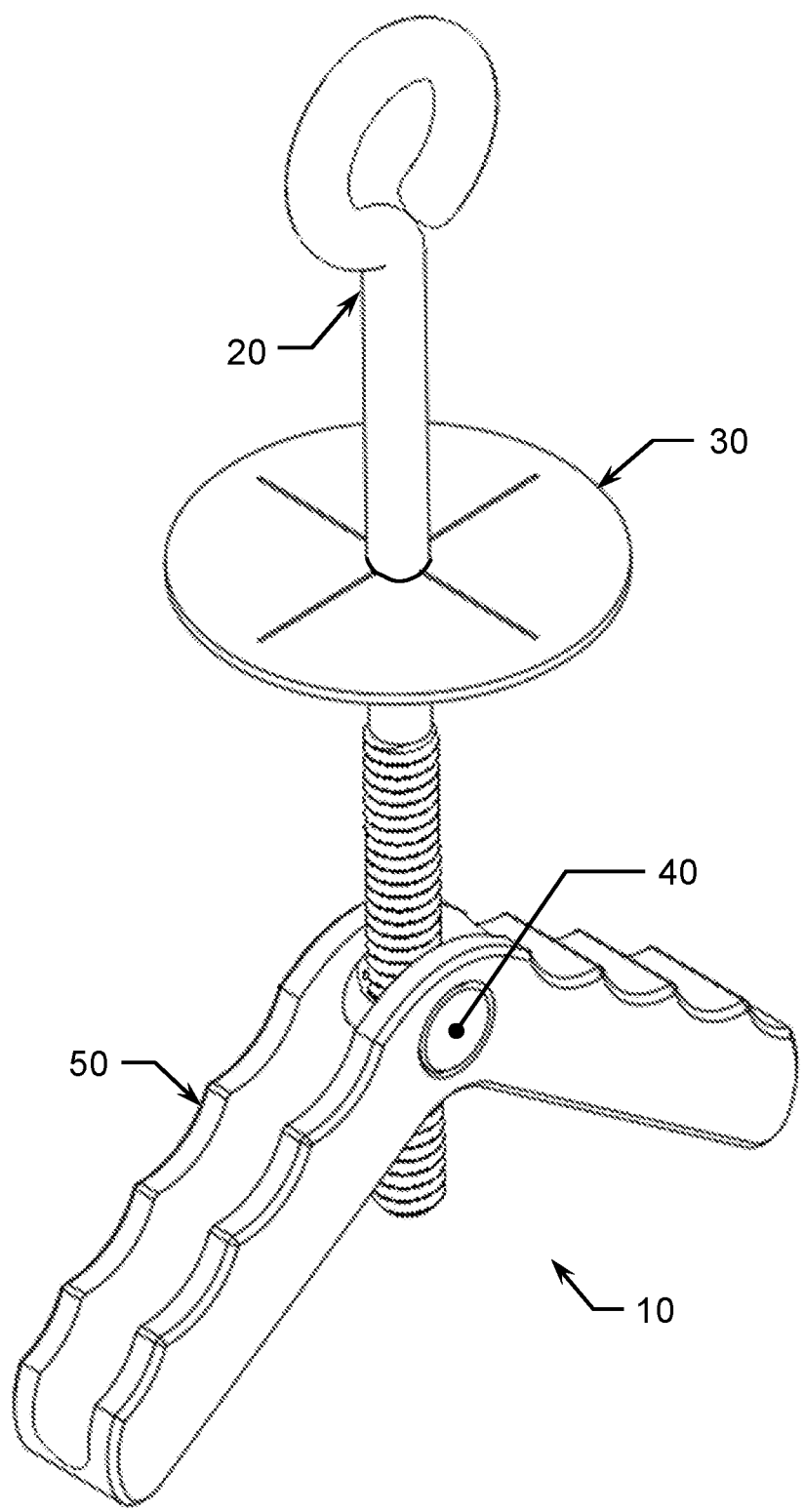
FIG. 1 is an assembled (unfolded) trimetric view of the TDA.
Figure 2:
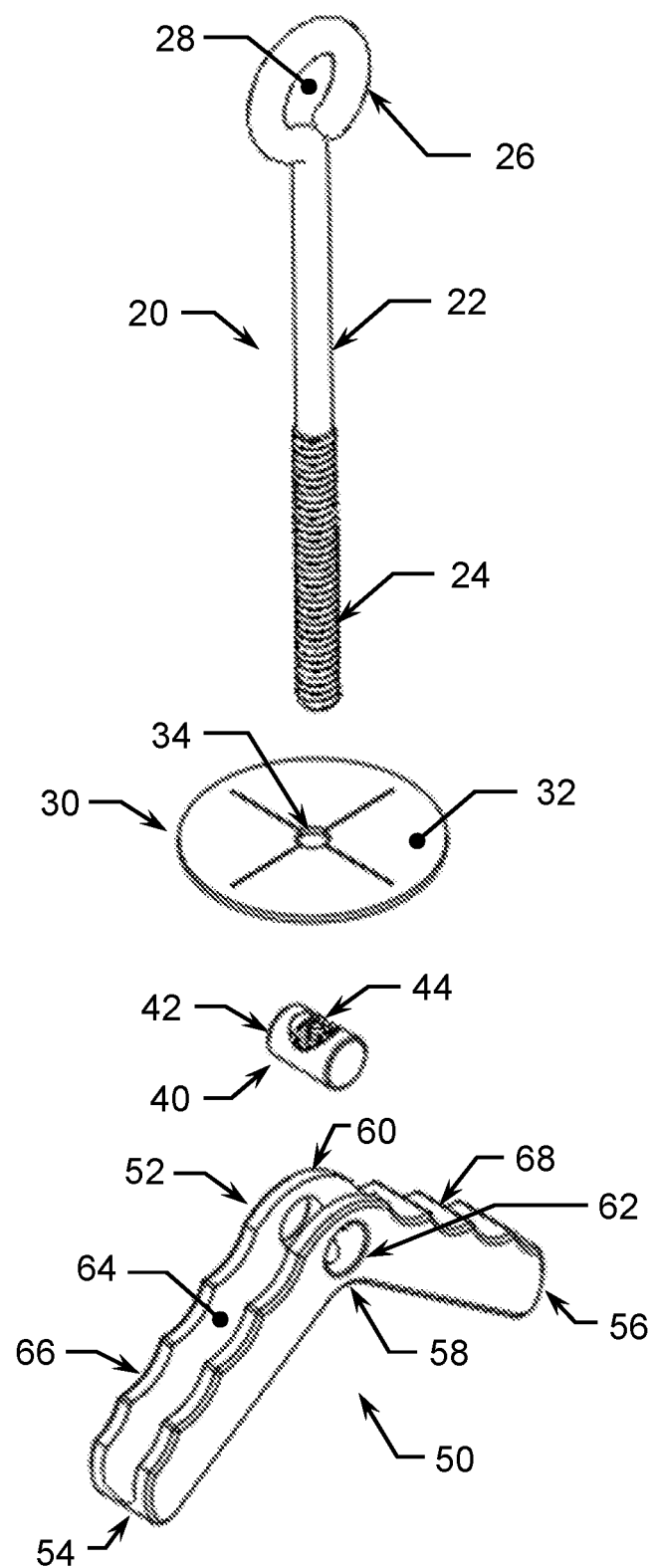
FIG. 2 is an exploded trimetric view of the TDA.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature | # | Feature |
| --- | --- | --- | --- |
| 10 | Taxidermy display apparatus | 20 | Eyebolt |
| 22 | Unthreaded shank portion | 24 | Threaded shank portion |
| 26 | Looped shank portion | 28 | Eyebolt opening |
| 30 | Washer | 32 | Washer body |
| 34 | Washer threaded hole | 40 | Barrel nut |
| 42 | Nut body | 44 | Nut threaded hole |
| 50 | Anchor | 52 | Anchor body |
| 54 | Anchor first side | 56 | Anchor second side |
| 58 | Anchor lower surface | 60 | Anchor upper surface |
| 62 | Nut retention hole | 64 | Bolt reception channel |
| 66 | First notch set | 68 | Second notch set |
| 70 | Taxidermy animal skull (ref.) | | |

37 Referring now to the drawings, a first embodiment of taxidermy display apparatus (TDA) 10 comprises eyebolt 20, washer 30, barrel nut 40, and anchor 50. Eyebolt 20 preferably defines a substantially conventional metal eyebolt such as are readily commercially available (see for instance: the Wikipedia website entry for "Eye Bolt") comprising an unthreaded shank portion 22, a threaded shank portion 24, a looped shank portion 26, and an eyebolt opening 28. Washer 30 preferably defines a substantially conventional generally flat disk-shaped metal washer such as are readily commercially available (see for instance: the Wikipedia website entry for "Washer (hardware)") comprising a washer body 32 having a threaded hole 34 formed therein. Barrel nut 40 preferably defines a substantially conventional barrel nut such as are readily commercially available (see for instance: the Wikipedia website entry for "Barrel Nut") comprising a nut body 42 having a longitudinal axis and a threaded thru hole 44 formed therein and positioned substantially centrally in nut body 42 and substantially normal (perpendicular) to the longitudinal axis thereof. Anchor 50 comprises a preferably generally acute angular-shaped metal anchor having anchor body 52, anchor first side 54, anchor second side 56, anchor lower surface 58, and anchor upper surface 60. Anchor 50 further preferably includes nut retention hole 62 formed therein and preferably centrally located in an apex of generally acute angular-shaped metal anchor body 52, and bolt reception channel 64 formed in anchor first side 54. Anchor 50 further preferably includes first notch set 66 comprising a plurality of scalloped notches formed on anchor upper surface 60 of anchor first side 54, and second notch set 68 comprising a plurality of scalloped notches formed on anchor upper surface 60 of anchor second side 56.

TDA 10 is assembled such that washer 30 is positioned onto unthreaded shank portion 22 of eyebolt 20 and threaded shank portion 24 of eyebolt 20 is passed through an opening of a taxidermy mount object such as reference animal skull 70. Barrel nut 40 is rotatably positioned in nut retention hole 62 of anchor 50, and then with anchor 50 positioned thereon, barrel nut 40 is threaded onto threaded shank portion 24 of eyebolt 20 and tightened until anchor 50 comes into a "comfortable" and stable hangable proximity to an inside/underside of animal skull 70 so as to substantially form the TDA 10 configuration shown in FIG. 1, and FIG. 4-FIG. 6. Due to the angular shape of anchor 50 and notch set 66 and 68 of anchor 50, TDA 10 is substantially self-aligning, self-centering, and will adapt to a plurality of taxidermy mount objects (e.g. different sized and shaped animal skulls).

Figure 3:
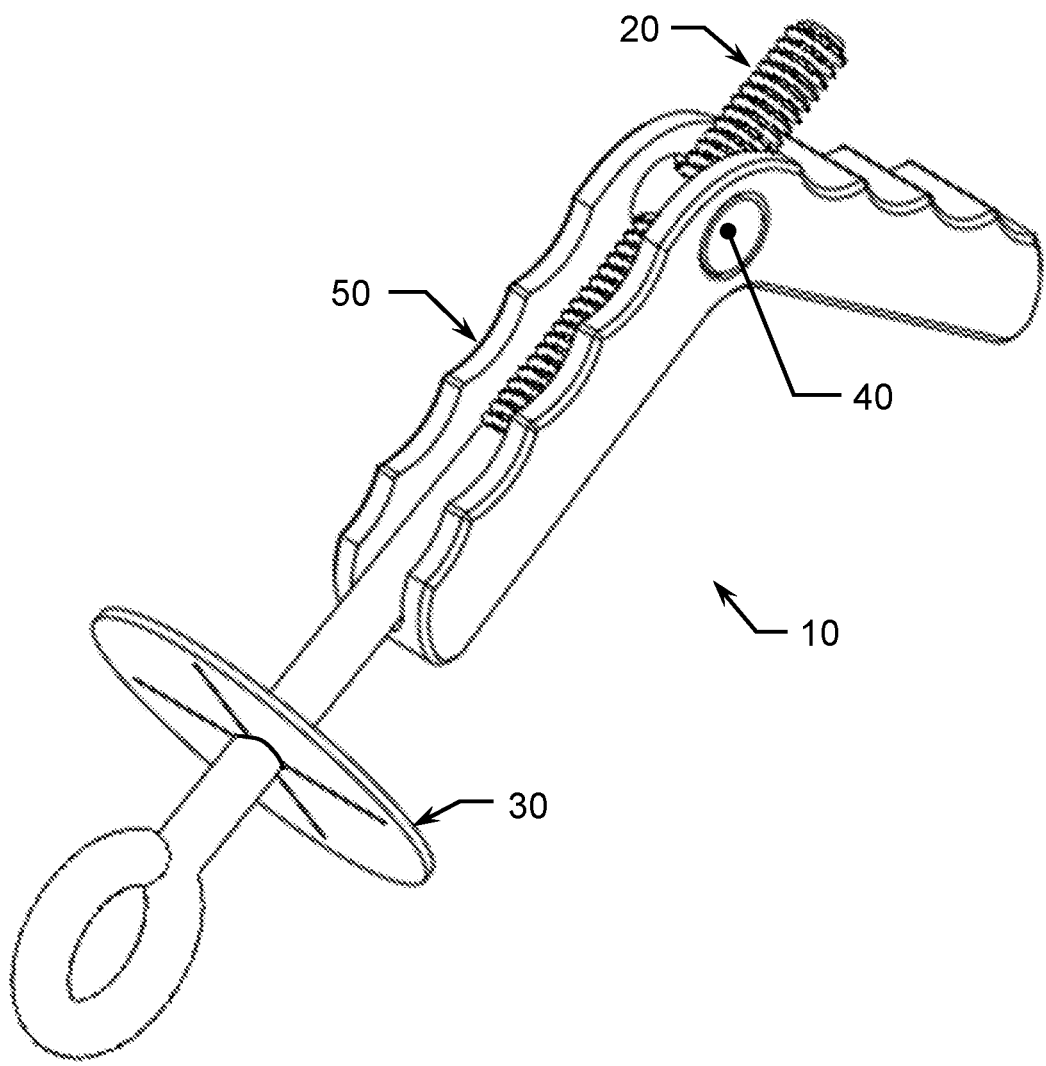
FIG. 3 is an assembled trimetric view of the TDA with the TD in a folded position.
Figure 4:
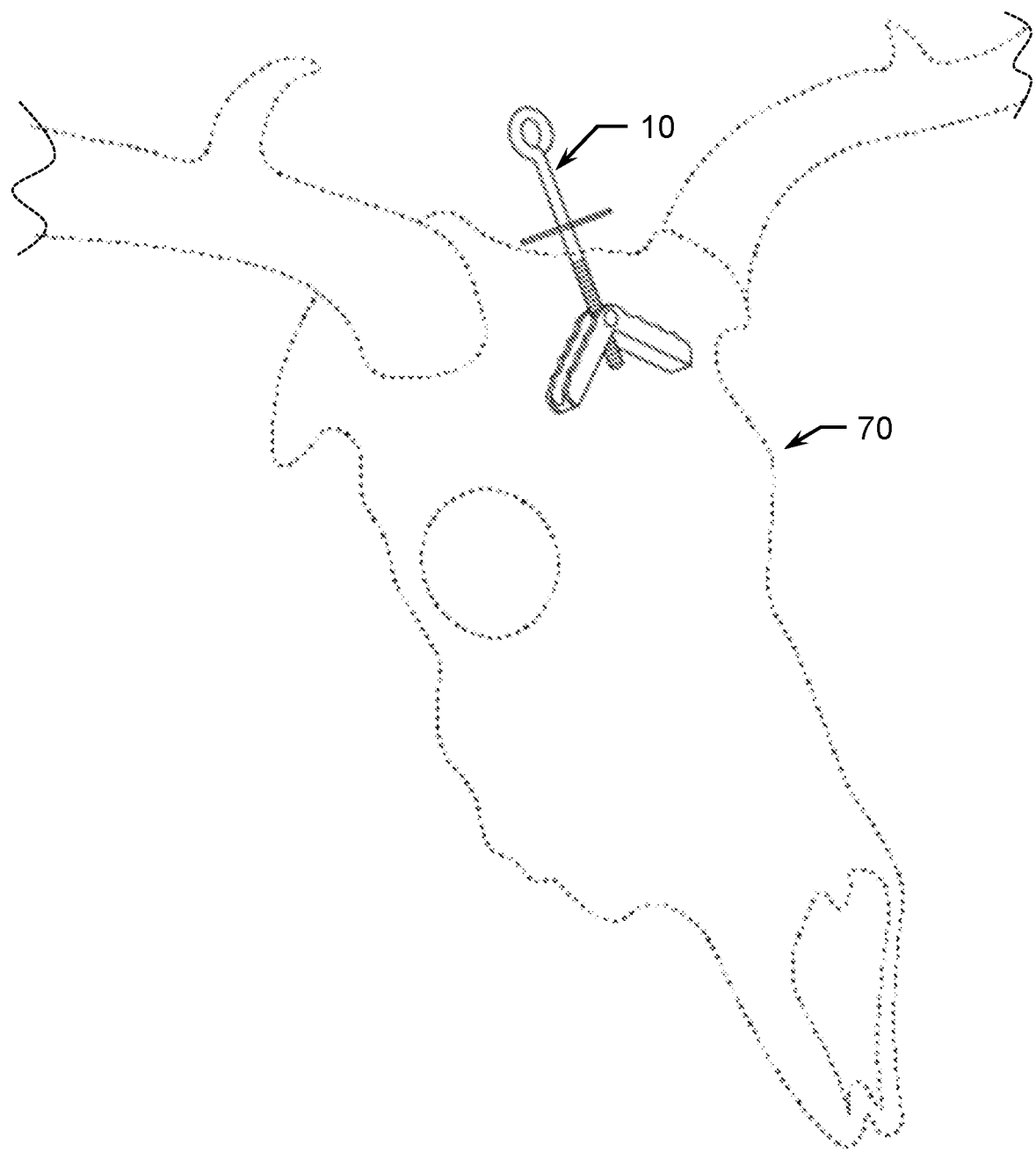
FIG. 4 is an assembled trimetric view of the TDA with a reference taxidermy skull mounted thereon and in a display position.
Figure 5:
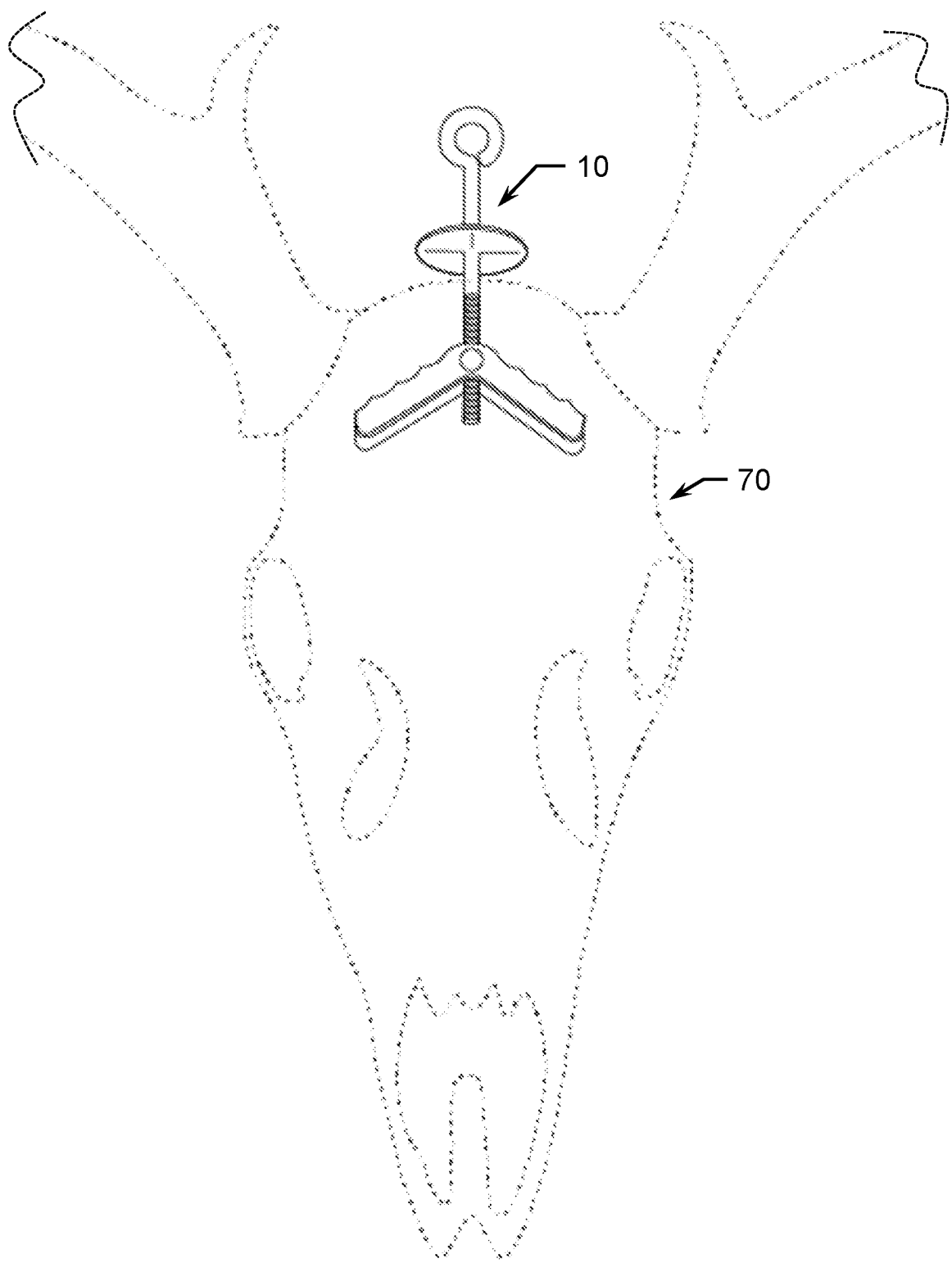
FIG. 5 is an assembled front view of the TDA with a reference taxidermy skull mounted thereon and in a display position.
Figure 6:
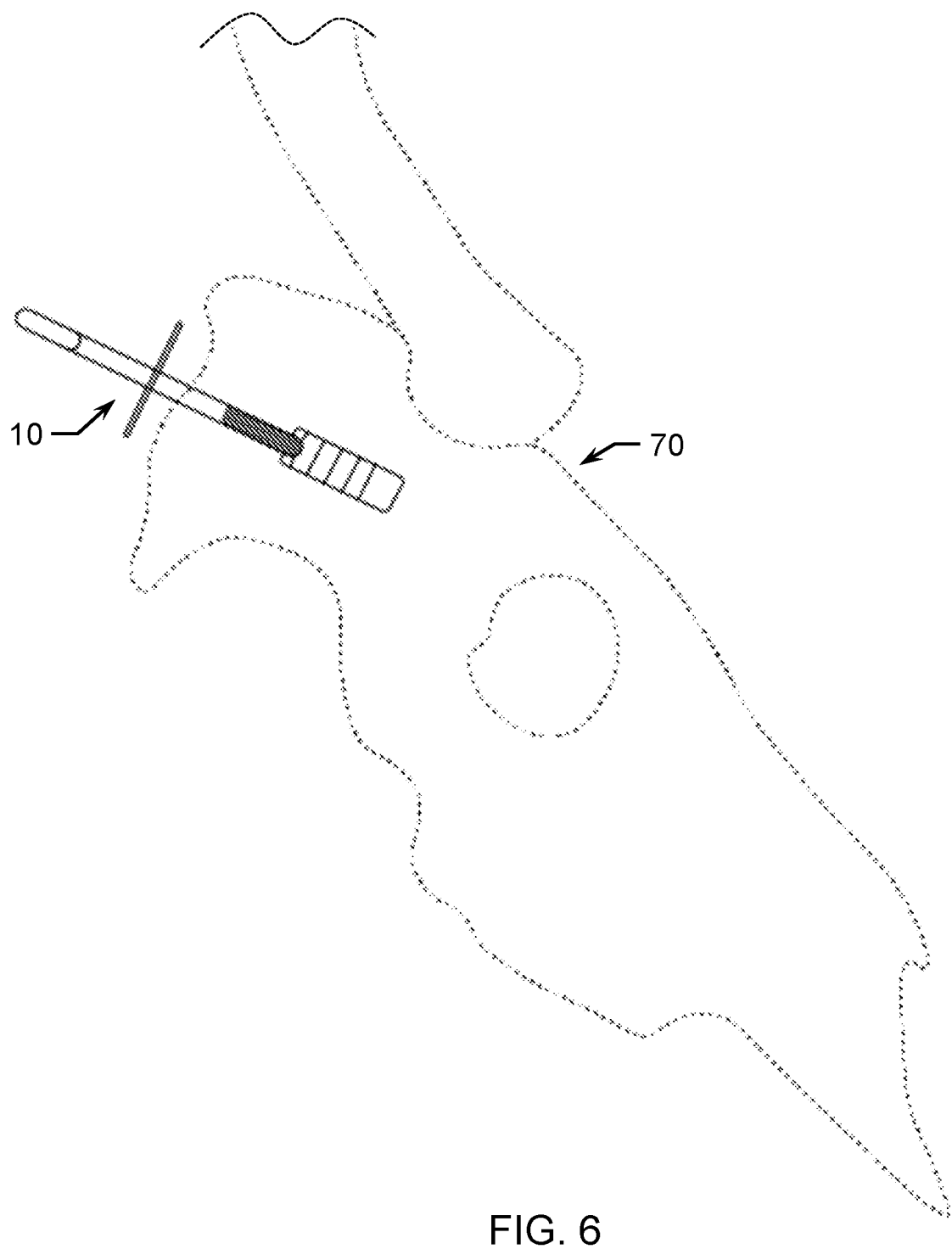
FIG. 6 is an assembled left side view of the TDA with a reference taxidermy skull mounted thereon and in a display position.

In practice, with TDA 10 thus assembled, a taxidermy mount object and be easily and conveniently hung or suspending from an accompanying structure by placing a support structure through eyebolt opening 28 SO as to display a (preferably European style, see: the Wikipedia website entry for "Skull Mounts") taxidermy mount object as shown in FIG. 4-FIG. 6. When not in use, TDA 10 may be folded into a compact size and configuration by unthreading eyebolt 20 from barrel nut 40, removing still assembled eyebolt 20/washer 30 and barrel nut 40/anchor 50 from animal skull 70, rotating barrel nut 40 such that an axis of threaded hole 44 is in line with bolt reception channel 64, positioning eyebolt 20 within bolt reception channel 64, and threading threaded shank portion 24 at least part way into threaded hole 44 so as to substantially form the TDA 10 configuration shown in FIG. 3.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A taxidermy display apparatus for use in displaying a taxidermy mount object comprising a taxidermy anchor defining a non-articulated non-spring-loaded acute angular anchor having a first side, a second side, an upper surface, and a lower surface, said anchor having at least one substantially centrally located hole formed therein, wherein said first side includes an open channel formed therein and a plurality of scalloped notches formed on an upper surface thereof, and wherein said second side includes a plurality of scalloped notches formed on an upper surface thereof.

2. The apparatus of claim 1, wherein said apparatus further comprises a barrel nut rotatably positioned in said hole and an eyebolt having a washer positioned thereon and threadedly retained in a threaded hole formed in said barrel nut.

3. The apparatus of claim 2, wherein said apparatus further comprises a taxidermy mount object positioned on said anchor.

4. The apparatus of claim 3, wherein said apparatus includes a support structure positioned in an opening of said eyebolt so as to cause said apparatus to be suspended therefrom.

5. The apparatus of claim 2, wherein said apparatus comprises a reconfigurable apparatus having at least one non-folded configuration adapted to suspending a taxidermy mount object, and at least one folded configuration adapted to compactly store said apparatus.

6. The apparatus of claim 1, wherein said anchor is adapted such that said anchor is suspendingly positionable in a plurality of taxidermy skulls of different sizes and shapes.

7. The apparatus of claim 1, wherein said anchor is adapted such that when said anchor is positioned in hanging contact within a taxidermy skull, said anchor self-aligns.

8. A taxidermy display apparatus for use in displaying a taxidermy mount object comprising a non-articulated non-spring-loaded acute angular anchor having at least one hole formed therein, a barrel nut rotatably positioned in said hole, and an eyebolt having a washer positioned thereon and threadedly retained in a threaded hole formed in said barrel nut.

9. The apparatus of claim 8, wherein said anchor further comprises a first side, a second side, an upper surface, and a lower surface, said at least one hole being substantially centrally located in said anchor, wherein said anchor first side includes an open channel formed therein and a plurality of scalloped notches formed on an upper surface thereof, and wherein said anchor second side includes a plurality of scalloped notches formed on an upper surface thereof.

10. The apparatus of claim 8, wherein said apparatus further comprises a taxidermy mount object positioned on said anchor.

11. The apparatus of claim 10, wherein said apparatus includes a support structure positioned in an opening of said eyebolt so as to cause said apparatus to be suspended therefrom.

12. The apparatus of claim 8, wherein said apparatus comprises a reconfigurable apparatus having at least one non-folded configuration adapted to suspending a taxidermy mount object, and at least one folded configuration adapted to compactly store said apparatus.

13. The apparatus of claim 8, wherein said anchor is adapted such that said anchor is suspendingly positionable in a plurality of taxidermy skulls of different sizes and shapes.

14. The apparatus of claim 8, wherein said anchor is adapted such that when said anchor is positioned in hanging contact within a taxidermy skull, said anchor self-aligns.

15. A method of displaying a taxidermy mount object comprising:

providing a taxidermy display apparatus comprising a non-articulated non-spring-loaded acute angular anchor having at least one substantially centrally located hole formed therein, a barrel nut rotatably positioned in said hole, and an eyebolt having a washer positioned thereon and threadedly retained in a threaded hole formed in said barrel nut, wherein said anchor comprises a first side, a second side, an upper surface, and a lower surface, wherein said anchor first side includes an open channel formed therein and a plurality of scalloped notches formed on an upper surface thereof, and wherein said anchor second side includes a plurality of scalloped notches formed on an upper surface thereof, positioning a taxidermy mount object on said taxidermy display apparatus, and suspending said taxidermy display apparatus on a support structure.

16. The method of claim 15, wherein said apparatus comprises a reconfigurable apparatus having at least one non-folded configuration adapted to suspending a taxidermy mount object, and at least one folded configuration adapted to compactly store said apparatus.

17. The method of claim 15, wherein said anchor is adapted such that said anchor is suspendingly positionable in a plurality of taxidermy skulls of different sizes and shapes.

18. The method of claim 15, wherein said anchor is adapted such that when said anchor is positioned in hanging contact within a taxidermy skull, said anchor self-aligns.

19. The method of claim 15, wherein said method includes the step of reconfiguring said apparatus, said reconfiguration comprising at least one of reconfiguring said apparatus from a folded configuration to an un-folded configuration and reconfiguring said apparatus from an un-folded configuration to a folded configuration.

20. The method of claim 15, wherein said method includes the step of causing said anchor to self-align.

* * * * *